US012620572B1

(12) United States Patent
Wang et al.

(10) Patent No.: US 12,620,572 B1
(45) Date of Patent: May 5, 2026

(54) METHODS OF MAKING LITHIUM METAL OXIDE FILMS AND SOLID-STATE LITHIUM-BASED BATTERIES CONTAINING THE SAME USING WET ANNEALING

(71) Applicant: Ensurge Micropower ASA, Oslo (NO)

(72) Inventors: Zhongchun Wang, San Jose, CA (US); Arvind Kamath, Los Altos, CA (US)

(73) Assignee: Ensurge Micropower ASA, Oslo (NO)

( * ) Notice: Subject to any disclaimer, the term of this patent is extended or adjusted under 35 U.S.C. 154(b) by 24 days.

(21) Appl. No.: 18/473,218

(22) Filed: Sep. 23, 2023

Related U.S. Application Data

(60) Provisional application No. 63/377,928, filed on Sep. 30, 2022.

(51) Int. Cl.
*H01M 4/04* (2006.01)
*H01M 4/02* (2006.01)
*H01M 4/505* (2010.01)
*H01M 4/525* (2010.01)

(52) U.S. Cl.
CPC ....... *H01M 4/0471* (2013.01); *H01M 4/0404* (2013.01); *H01M 2004/028* (2013.01); *H01M 4/505* (2013.01); *H01M 4/525* (2013.01)

(58) Field of Classification Search
CPC ...... H01M 4/0471; H01M 4/04; H01M 4/505; H01M 4/525
See application file for complete search history.

(56) References Cited

U.S. PATENT DOCUMENTS 9,012,091 B2 * 4/2015 Wu .......................... H01M 8/10
                                                         429/231.95
9,093,708 B2 * 7/2015 Oki ..................... H01M 4/0423
9,327,249 B2 * 5/2016 Albro .................... B01F 23/802
9,395,593 B2 * 7/2016 Choi .................... G02F 1/1524

OTHER PUBLICATIONS

Bekzhanov et al.; "Annealing Optimization of Lithium Cobalt Oxide Thin Film for Use as a Cathode in Lithium-Ion Microbatteries," Nanomaterials 2022, 12, 2188. https://doi.org/10.3390/nano12132188; www.mdpi.com/journal/nanomaterials.

(Continued)

*Primary Examiner* — Michael P Wieczorek
(74) *Attorney, Agent, or Firm* — Polygon IP, LLP

(57) ABSTRACT

A method of making a lithium metal oxide film is disclosed. The method includes wet annealing the lithium metal oxide film in a first phase at a first temperature of 450-750° C. for a first length of time (e.g., at least 0.1 hour), in a first oxygen-containing atmosphere further containing a first concentration or amount of water vapor. The first concentration or amount of water vapor is >0, and the metal in the lithium metal oxide is selected from cobalt, manganese, nickel, titanium and iron. The method may further include a second wet annealing phase, conducted at a second temperature for a second length of time, in a second oxygen-containing atmosphere further containing a second concentration or amount of water vapor. The method may further include dry annealing the lithium metal oxide film at a third temperature for a third length of time, in a third oxygen-containing atmosphere in the absence of water vapor.

20 Claims, 7 Drawing Sheets

(56) References Cited

OTHER PUBLICATIONS

Kim et al.; "Characteristics of rapid-thermal-annealed LiCoO2 cathode film for an all-solid-state thin film microbattery," Journal of Vacuum Science & Technology A 22, 1182 (2004); https://doi.org/10.1116/1.1763906; Published Online: Jun. 24, 2004; American Vacuum Society.

Nomura et al.; "Defect passivation and homogenization of amorphous oxide thin-film transistor by wet O2 annealing," Applied Physics Letters 93, 192107 (2008); doi: 10.1063/1.3020714; AIP Publishing.

Naraparaju et al.; "Effect of moisture on the oxidation behavior of ZrB2," J Am Ceram Soc. 2021; 104:1058-1066; Wiley Periodicals LLC.

* cited by examiner

100

120          115

110

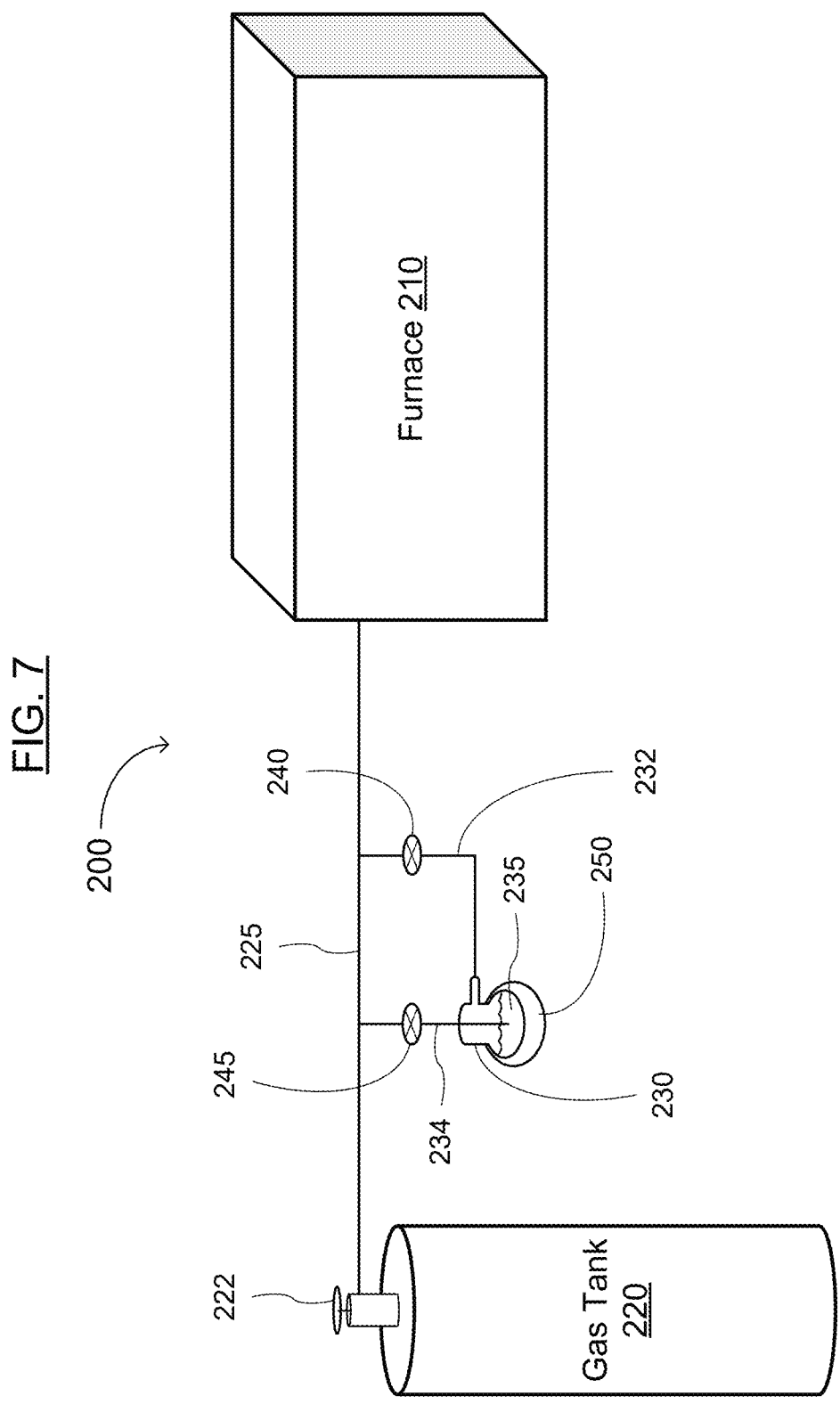
_FIG. 7_

METHODS OF MAKING LITHIUM METAL OXIDE FILMS AND SOLID-STATE LITHIUM-BASED BATTERIES CONTAINING THE SAME USING WET ANNEALING

CROSS-REFERENCE TO RELATED APPLICATIONS

This application claims the benefit of U.S. Provisional Pat. Appl. No. 63/377,928, filed Sep. 30, 2022, incorporated herein by reference in its entirety.

FIELD OF THE INVENTION

The present invention generally relates to the field of solid-state and/or thin film batteries. More specifically, embodiments of the present invention pertain to methods of making a lithium metal oxide film and a lithium-based solid-state battery containing the film.

DISCUSSION OF THE BACKGROUND

Crystallization of amorphous $LiCoO_2$ on precious metals is known. An example of this crystallization is discussed in Kim et al., "Characteristics of rapid-thermal-annealed $LiCoO_2$ cathode film for an all-solid-state thin film micro-battery," *J. Vac. Sci. Technol. A*, 22(4), July/August 2004, where an anneal at 700° C. for 20 minutes of an amorphous layer of $LiCoO_2$ deposited on a platinum film on a high-temperature MgO/Si substrate provides for crystallization of the $LiCoO_2$ material, as shown by x-ray diffraction data. In Kim et al., it was shown that such a crystalline film is capable of constituting the lithium-ion-containing cathode layer of a functional all solid-state lithium battery.

For the synthesis of $LiCoO_2$ films, various methods have been investigated such as magnetron sputtering, sol-gel synthesis, pulsed laser deposition (PLD), chemical vapor deposition (CVD), and laser ablation. It is important to obtain $LiCoO_2$ films with a beneficial or optimal crystal structure, in order to utilize the beneficial properties of $LiCoO_2$, such as high electronic conductivity and charge capacity. However, obtaining a pure crystal phase in a $LiCoO_2$ film is still challenging, and there is a lack of experimental guidelines on how to obtain an operationally robust and reliable $LiCoO_2$ film. Among the methods known to the present inventors, sputtering followed by post-deposition annealing is the easiest, most scalable, and most applicable technique for the deposition of uniform films.

It was found in one study of transparent amorphous In—Ga—Zn—O semiconductor films for thin-film transistors that wet $O_2$ annealing is more effective to decrease electron traps, enhance TFT performance, and homogenize TFT characteristics than dry $O_2$ annealing. Furthermore, the findings were understood to relate to stronger oxidation power of $H_2O$-related species and consequent stabilization of chemical bonds.

Oxidation studies of $ZrB_2$ were performed in another study under wet air and dry air conditions at 1200° C., 1400° C., and 1500° C. for 1, 4, and 10 h. Compared to dry air, the presence of water vapor was found to enhance the oxidation kinetics by a factor of 7 to 30, depending on the temperature. Thermodynamic calculations suggested that water vapor promoted the formation of additional volatile species such as boric acid (e.g., $HBO_2$), in addition to boria ($B_2O_3$, which is produced in dry air). The boric acid increases the evaporation rate of $B_2O_3$. Compared to dry air, the presence of water vapor leads to more rapid evaporation of boria and a transition from parabolic oxidation kinetic behavior (i.e., in which the rate of oxidation is controlled by diffusion of oxidizing species through boria) to linear (i.e., the underlying $ZrB_2$ is directly exposed to the oxidizing environment) at shorter times and lower temperatures.

It is also of continuing interest for the manufacture of solid-state lithium batteries to further reduce the thermal budget of any post-deposition anneal, both in time and in temperature, so as to enable the manufacture of such batteries without the need for expensive precious metal nucleation, barrier layers, or expensive high-temperature substrates. The present inventors are unaware of any existing process that allows for production of a cathode film for a battery in which the post-deposition anneal process has a sufficiently low thermal budget to allow production of functional structures for batteries on low-temperature materials such as stainless steel, aluminum, or copper foil.

SUMMARY OF THE INVENTION

The present invention relates to solid-state and thin film batteries, and more specifically to methods of making a lithium metal oxide film and a lithium-based solid-state battery containing the film. In one aspect, the present invention relates to a method of making a lithium metal oxide film, comprising wet annealing the lithium metal oxide film at a first temperature of 450-750° C. for a first length of time (e.g., of at least 0.02 hour), in a first oxygen-containing atmosphere further containing a first concentration or amount of water vapor. The first concentration or amount of water vapor is >0 (e.g., mol/L, g/L, % by weight or moles of all gases in the first oxygen-containing atmosphere, etc.). The metal may be cobalt (Co), manganese (Mn), nickel (Ni), titanium (Ti) or iron (Fe).

In one aspect, wet annealing the lithium metal oxide film may be conducted in first and second phases. The first phase may be as described in the preceding paragraph (e.g., at the first temperature, for the first length of time, and in the first oxygen-containing atmosphere), and the second phase may be conducted at a second temperature for a second length of time, in a second oxygen-containing atmosphere further containing a second concentration or amount of water vapor. The second temperature, which is also generally in the range of 450-750° C., may be the same as or different from (e.g., ±50° C.) the first temperature, but is generally the same as the first temperature. The second length of time may be the same as or different from the first length of time, but the first and second lengths of time together are generally in the range of 0.1-8 hours (or any length of time or range of lengths of time therein). The second oxygen-containing atmosphere may be the same as or different from first oxygen-containing atmosphere, but the second concentration or amount of water vapor is typically greater than the first concentration or amount of water vapor.

The method may further comprise dry annealing the lithium metal oxide film (after the wet annealing step) at a third temperature for a third length of time, in a third oxygen-containing atmosphere. The third temperature may be greater than the first temperature (and, when wet annealing comprises two phases, the second temperature), and the third length of time may be less than or equal to the first length of time (and, when wet annealing comprises two phases, is less than the combined first and second lengths of time). The third oxygen-containing atmosphere is substantially free of water vapor.

Another aspect of the invention relates to a method of making a lithium-based solid-state battery or battery cell, comprising depositing a lithium metal oxide film on a metal substrate, and annealing the lithium metal oxide film by the present method of making a lithium metal oxide film. The metal substrate may function as a cathode current collector in the solid-state battery or battery cell. Other steps in the method of making a lithium-based solid-state battery or battery cell (e.g., forming a cathode on the metal substrate when the metal substrate functions as a cathode current collector, or forming a cathode current collector on the metal substrate and a cathode on the cathode current collector when the metal substrate does not function as a cathode current collector; forming a solid-phase or solid-state electrolyte layer on the cathode; optionally forming an anode on the electrolyte layer; forming an anode current collector on the anode when the anode is present, or on the electrolyte layer when the anode is absent; forming electrical contacts to the cathode current collector and anode/anode current collector, and encapsulating and/or packaging the battery or battery cell) are disclosed in U.S. Pat. Appl. Publ. Nos. 2021/0320355, 2021/0320323 and 2021/0320324 and in U.S. Provisional Pat. Appl. Nos. 63/343,035, 63/343,522 and 63/343,526, the relevant portions of which are incorporated herein by reference. The cathode in the lithium-based solid-state battery or battery cell may comprise a lithium metal oxide such as lithium cobalt oxide ($LiCoO_2$; LCO), lithium nickel manganese oxide (e.g., $LiNi_{0.5}Mn_{1.5}O_4$; LNMO), or lithium manganese oxide ($LiMn_2O_4$; LMO). The lithium metal oxide cathode may be made using the present method. Alternatively, the cathode may comprise a mixed lithium metal oxide-phosphate such as lithium iron phosphate ($LiFePO_4$; LFP), which may also be made using the present method. The metal substrate may comprise a metal foil, and in other or further embodiments, the metal substrate or foil may further comprise a barrier (e.g., a diffusion barrier layer) thereon. The diffusion barrier may comprise a glass or ceramic, such as silicon dioxide, aluminum oxide, silicon nitride, or a silicon and/or aluminum oxynitride; a metal nitride, such as aluminum nitride and/or tungsten nitride; or a combination thereof.

Yet another aspect of the invention relates to an annealing apparatus, comprising a furnace configured to heat a lithium metal oxide film at a temperature of 450-750° C. for a first length of time (e.g., of at least 0.02 hour), a source of an oxygen-containing gas in fluid communication with the furnace, a source of water vapor in fluid communication with the furnace and optionally the oxygen-containing gas, and a first valve between the source of the water vapor and the furnace, configured to open and close the fluid communication between the source of the water vapor and the furnace. The metal in the lithium metal oxide film may be selected from cobalt (Co), manganese (Mn), nickel (Ni), titanium (Ti) and iron (Fe). In various embodiments, the source of the oxygen-containing gas comprises a tank of the oxygen-containing gas, and the oxygen-containing gas may be clean dry air, filtered air, ambient air, scuba gas, or oxygen. In other or further embodiments, the source of the water vapor may be water (e.g., in a heatable container or vessel), humidity in the ambient air, water molecules adsorbed onto walls and/or other surfaces of the furnace, etc. In one example, the apparatus further comprises a heater configured to heat the water in the heatable container or vessel.

In various embodiments, the fluid communication between the source of the water vapor and the furnace comprises a water vapor line, and the fluid communication between the source of the oxygen-containing gas and the furnace comprises a gas line. In such embodiments, the apparatus may further comprise a second valve between the source of the oxygen-containing gas and the furnace, configured to open and close the fluid communication between the source of the oxygen-containing gas and the furnace; a third valve between the gas line and an inlet to the source of the water vapor, configured to control a flow of the oxygen-containing gas to the source of the water vapor; and/or first and second connectors or couplers operably (i) splitting the gas line into a furnace gas supply line and a water vessel gas supply line and (ii) joining a water vapor supply line from the water container or vessel to the furnace gas supply line, respectively.

Other capabilities and advantages of the present invention will become readily apparent from the detailed description of various embodiments below.

BRIEF DESCRIPTION OF THE DRAWINGS

(FIG. 5B), both in accordance with the present invention.

(FIG. 6B), both in accordance with the present invention.

FIG. 7 is a diagram of an exemplary apparatus for practicing the method of wet annealing a lithium metal oxide film in accordance with one or more embodiments of the present invention.

DETAILED DESCRIPTION

Figures 1, 2:
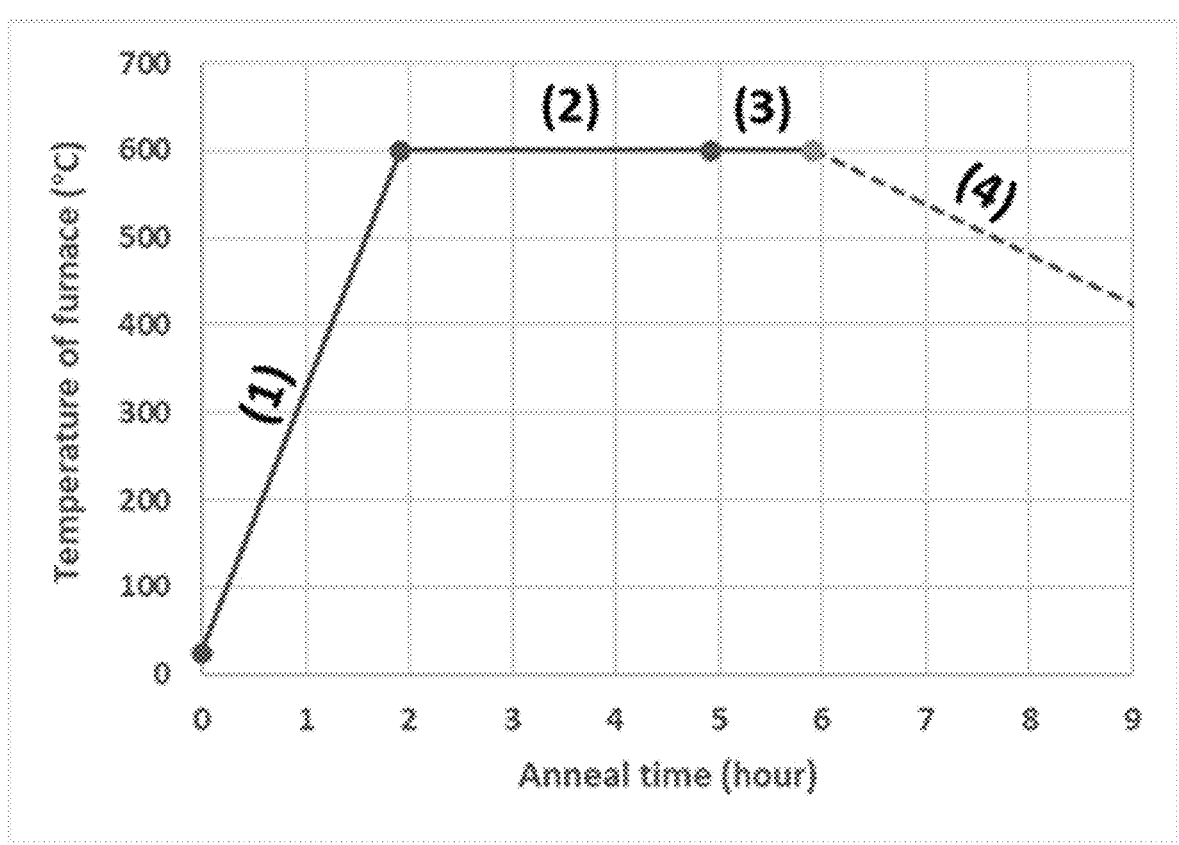
FIG. 1 is a graph showing the temperature as a function of time in an exemplary wet annealing process in accordance with the present invention.
FIG. 2 is a side view of a substrate with a lithium metal oxide cathode thereon, suitable for a solid-state battery in accordance with embodiments of the present invention.

Reference will now be made in detail to one or more embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

For the sake of convenience and simplicity, "part," "portion," and "region" may be used interchangeably herein, but are generally given their art-recognized meanings. Wherever one such term is used, it also encompasses the other terms. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

The terms "lower" and "upper" are used herein as convenient labels for the same or similar structures having a relative position to the other(s) as shown in the drawings, but which can change their relative position(s) depending on the orientation of the apparatus or other structure in the drawing(s). Similarly, the terms "downstream" and "upstream" are convenient labels for relative positions of two or more components of an apparatus or system with respect to the flow of one or more gas(es) or fluid(s) within the apparatus or system. Also, for convenience and simplicity, the terms "connected to," "coupled with," "coupled to," "joined to," "attached to," "fixed to," "affixed to," "in communication with," and grammatical variations thereof may be used interchangeably, and refer to both direct and indirect connections, couplings, joints, attachments and communications (unless the context of its use unambiguously indicates otherwise), but these terms are also generally given their art-recognized meanings.

Herein, the term "lithium metal oxide" refers to a fully-oxidized lithium-transition metal compound, and may include mixed oxides, phosphates, sulfates and nitrates of lithium and one or more transition metal atoms that have characteristics and/or properties suitable as a cathode or an anode in a solid-state battery or battery cell.

Exemplary Methods of Making a Lithium Metal Oxide Film

In accordance with one aspect of the present invention, "wet" annealing a lithium metal oxide film comprises at least two phases: a "semi-wet" phase (e.g., step (2) in FIG. 1) and a "fully wet" phase (e.g., step (3) in FIG. 1). More specifically, lithium metal oxide (e.g., $LiCoO_2$) films on conductive substrates are wet-annealed in a furnace (e.g., a box furnace 210 as shown in FIG. 7) or other annealing equipment, generally in three steps, with an optional fourth controlled cool-down step (e.g., step (4) in FIG. 1).

Referring to FIG. 2, in most embodiments, the substrate 110 comprises a metal foil, which may comprise or consist essentially of stainless steel, aluminum, copper, nickel, inconel, brass, molybdenum or titanium, the elemental metals of which may be alloyed with up to 10% of one or more other elements to improve one or more physical and/or chemical properties thereof (e.g., oxygen and/or water permeability, flexibility, resistance to corrosion or chemical attack during subsequent processing, etc.). However, the substrate 110 can also be a metal sheet or metal roll. For example, the metal foil or film may be 10-100 μm thick, whereas a metal sheet may have a thickness of >100 μm, up to about 1-2 mm, although the invention is not so limited. Other alternative substrates include a metal coating on a mechanical substrate, such as aluminum, copper, nickel, titanium, etc., on a removable ceramic sheet or plate.

The substrate 110 may further include a barrier 115 that comprises one or more layers of one or more materials in a thickness effective to prevent migration of atoms or ions from the metal foil, sheet or film into overlying layers (e.g., a diffusion barrier). The barrier material(s) may comprise an electrically conductive material, such as a (refractory) metal nitride (e.g., aluminum nitride, titanium aluminum nitride, tungsten nitride, titanium tungsten nitride, TiW alloy, tantalum nitride, etc.), or a glass or ceramic, such as silicon dioxide, aluminum oxide, silicon nitride, a silicon and/or aluminum oxynitride, etc. Some embodiments include first and second barriers, such as alternating glass/ceramic and (refractory) metal nitride layers (e.g., a first metal nitride layer, a first glass/ceramic layer, and a second metal nitride layer, which may further comprise a second glass/ceramic layer, a third metal nitride layer, etc.). The barrier 115 may have a total thickness of 0.01-3 μm, but the barrier 115 is not limited to this range. The barrier 115 may be blanket-deposited onto the foil, sheet or film by chemical or physical vapor deposition (e.g., sputtering, thermal evaporation, atomic layer deposition [ALD], etc.), solution-phase coating with a precursor material followed by annealing to form the glass/ceramic or metal nitride (which may result in the barrier effectively coating all surfaces of the substrate), etc. Exemplary barrier materials, structures and thicknesses and methods for their deposition are disclosed in U.S. Pat. Nos. 9,299,845 and 11,742,363, the relevant portions of each of which are incorporated by reference herein.

In the first step of the three-step method (e.g., step (1) in FIG. 1), the temperature of the furnace is ramped up at a rate of x ° C./min from room temperature to y ° C. For example, x may be a number in the range of 1-20° C./min, or any value or range of values therein (e.g., 5° C./min), and y may be a number in the range of 450-750° C., or any value or range of values therein (e.g., 550-690° C., 550-650° C., 600° C., etc.). Meanwhile, and referring now in part to the apparatus 200 in FIG. 7, an oxygen-containing gas such as clean dry air (CDA) may flow from a tank 220 through the furnace 210 at a rate in the range of 1-25 standard cubic feet per hour (SCFH), 2-50 standard liters per minute (SLPM), or any value or range of values therein (e.g., 5-15 SCFH, 10 SCFH, 10-30 SLPM, etc.). The gas flow rate may depend on the dimensions of the furnace 210 and the samples to be annealed, and may be optimized based on (i) the size and shape of the furnace and the samples and (ii) the quantity of the samples. Alternatively, clean "moist" (undried) air, scuba gas, or oxygen may flow from the tank 220 through the furnace 210, instead of CDA.

Referring back to FIG. 1, in the second step (e.g., step (2)) of the three-step method (i.e., the "semi-wet" phase), the temperature of the furnace 210 is held at y ° C. for n hours, where n may be in the range of 0.02-8 hours, or any value or range of values therein (e.g., 0.1-6 hours, 10 minutes to 3 hours, 20 minutes to 1 hour, etc.). Meanwhile, the oxygen-containing gas may flow through the furnace 210 at a rate in the range of 1-25 SCFH or 2-50 SLPM, as described herein, along with water vapor. In effect, the oxygen-containing gas acts as a carrier for the water vapor. The flow rate of the oxygen-containing gas can be different from that in the first step. However, a relatively high flow rate can waste the oxygen-containing gas, cause excessive cooling of the system and the substrates, and/or dislodge or stir up dust particles in the furnace 210 (causing defects on the samples/in the batteries).

In one or more embodiments, referring now to FIG. 7, the furnace 210 is equipped with first and second gas lines 225 and 232 (e.g., a furnace gas supply line 225 and a water vapor supply line 232), respectively equipped with controllable valves 222 and 240. The first and second gas lines 225 and 232 respectively carry the oxygen-containing gas from the tank 220 and the water vapor from a water vapor source 230, and are combined into a single line (e.g., using a T-joint or similar junction or connector) before feeding the mixed ("semi-wet") oxygen-containing gas and water vapor into the furnace 210. The line 232 carrying water vapor may be connected to a bubbler 230 or other container or vessel containing water 235. In a further embodiment, the apparatus 200 may further comprise a gas inlet line 234 equipped with a controllable valve 245, configured to pass at least some of the oxygen-containing gas from the tank 220 through the water 235 in the bubbler 230 before joining with the lines 232 and 225 carrying the oxygen-containing gas to the furnace 210. The water 235 may comprise or consist essentially of deionized ("DI") water, distilled water, or distilled and deionized water, although other sources of water are also suitable.

Alternatively, as the oxygen-containing gas flows through the line 225, it may pass by the outlet or mouth of the water vapor line 232 and pull the water vapor from the bubbler 230 (e.g., the gas inlet line 234 and the valve[s]240 and/or 245 may not be present in the apparatus 200). The flowing oxygen-containing gas (e.g., in the first line 225) has a lower pressure than the water vapor (e.g., in the second line 232), creating a small vacuum that can pull the water vapor away from the bubbler 230, similar to a Venturi tube. The bubbler 230 may be filled with water 235 (e.g., hot or boiling water) prior to and/or during use. For example, the bubbler 230 may be wrapped with a heating mantle or other heating element 250 to raise the temperature of the water in the bubbler to boiling or near boiling (e.g., 80-100° C.). In general, a gas is not passed through the bubbler 230 during the "semi-wet" phase, and the bubbler 230 contains sufficient water therein to provide water vapor to the furnace 210 throughout the "semi-wet" phase.

In the third step (e.g., step (3) in FIG. 1) of the three-step method (i.e., the "fully wet" phase), the temperature of the furnace 210 is held at z ° C. for m minutes, where z may be from y−50° C. to y+100° C. (e.g., 500-750° C., 550-700° C., or any value or range of values therein), and m may be in the range of 5-180 minutes, 10-120 minutes, or any value or range of values therein (e.g., 60 minutes). In one example, z=y. Meanwhile, the valve 245 in the gas inlet line 234 may be opened, and the oxygen-containing gas may first flow through the water-containing bubbler 230 (e.g., containing hot or boiling water 235) at a rate in the range of 1-25 SCFH or 2-50 SLPM, as described herein, before passing through the furnace 210. The flow rate of the oxygen-containing gas in the "fully wet" phase can be different from that in the "semi-wet" phase and/or the first step.

The line 225 carrying the oxygen-containing gas may have a T-joint, Y-joint, 3-way valve or similar splitting junction or connector upstream from the valve 245 in the oxygen-containing gas line that diverts some or all of the oxygen-containing gas to the bubbler 230. The valve 245 in this oxygen-containing gas diverting line 234 may be closed during the "semi-wet" phase and the first step, and open or closed during the "fully wet" phase. It is beneficial for the bubbler 230 to contain sufficient water 235 to provide water vapor throughout the "fully wet" phase of the present method. Alternatively, the bubbler 230 may have a port (not shown) through which water can be added to the bubbler 230.

In an optional fourth step, the furnace 210 is powered off and allowed to cool down naturally. Meanwhile, the oxygen-containing gas may flow through the furnace 210 at a rate in the range of 1-25 SCFH or 2-50 SLPM, as described herein. Valve 222 in the oxygen-containing gas line to the furnace may be opened, and valves 245 and 240 in the lines 234 and 232 to and from the bubbler 230 may be closed, although one (e.g., the valve 240 between the bubbler and the furnace; a "semi-wet" configuration) or both valves 245 and 240 in the lines 234 and 232 to and from the bubbler 230 (the "fully wet" configuration) may be open in the fourth step.

The present method thus concerns a post-deposition anneal of a lithium metal oxide film 120 (FIG. 2) on a metal substrate 110 (with an optional conductive barrier layer 115), carried out at lower temperature (≤690° C.) in an oxygen-containing atmosphere (e.g., CDA) with a controlled (and optionally relatively low) concentration of water vapor. The lithium metal oxide film 120 may comprise a lithium-transition metal oxide (e.g., $LiMO_2$, M=Co, Ni, Mn, Ti) such as lithium cobalt oxide ($LiCoO_2$; LCO) and lithium manganese oxide ($LiMn_2O_4$; LMO), a layered lithium-transition metal oxide (e.g., $Li_{4/3-x}Ni^{2+}{}_xMn^{4+}{}_{2/3-x}Co^{3+}{}_xO_2$, sometimes termed "Li-rich NMC"), and fully oxidized lithium-transition metal compounds for anodes (e.g., $Li_4Ti_5O_{12}$) and cathodes, such as lithium iron phosphate ($LiFePO_4$; LFP) and lithium nickel manganese cobalt oxides (Li-rich and others).

Two annealing experiments were performed with $LiCoO_2$ films under dry and wet atmospheres, respectively. In the first experiment, a 10 μm $LiCoO_2$ film was vacuum-deposited on a 75 μm stainless steel substrate. The $LiCoO_2$ film was dry-annealed at 700° C. for 3 h in clean dry air (CDA). The annealing apparatus was cooled to 600° C. while maintaining a CDA atmosphere, and the $LiCoO_2$ film was wet-annealed at 600° C. for 1 h in CDA passed through a bubbler containing boiling water prior to introduction to the annealing apparatus. The annealing apparatus was then cooled down to room temperature in a CDA atmosphere.

In the second experiment, a 10 μm $LiCoO_2$ film was identically vacuum-deposited on an identical or substantially identical 75 μm stainless steel substrate. The $LiCoO_2$ film was wet-annealed at 600° C. for 4 h (a 3-h low moisture "semi-wet" phase+a 1-h "fully wet" phase, as described above), followed by dry annealing at 700° C. for 1 h in CDA. The annealing apparatus was then cooled down to room temperature in a CDA atmosphere as in the first experiment.

Figures 3, 4:
FIG. 3 depicts a somewhat hazy, partially peeling $LiCoO_2$ film after dry annealing for 4 hours, then wet annealing for 1 hour.
FIG. 4 depicts a smooth, uniform, and shiny $LiCoO_2$ film after wet annealing for 4 hours, then dry annealing for 1 hour, in accordance with the present invention.

In the first experiment, the $LiCoO_2$ film was dry-annealed at 700° C. before wet-annealing at 600° C. for 1 h. The sample shows severe lifting and haziness issues (FIG. 3). In the second experiment, the $LiCoO_2$ film was wet-annealed at 600° C. prior to a 700° C. dry anneal. The sample appeared smooth, uniform, and shiny (FIG. 4).

Figure 5A:
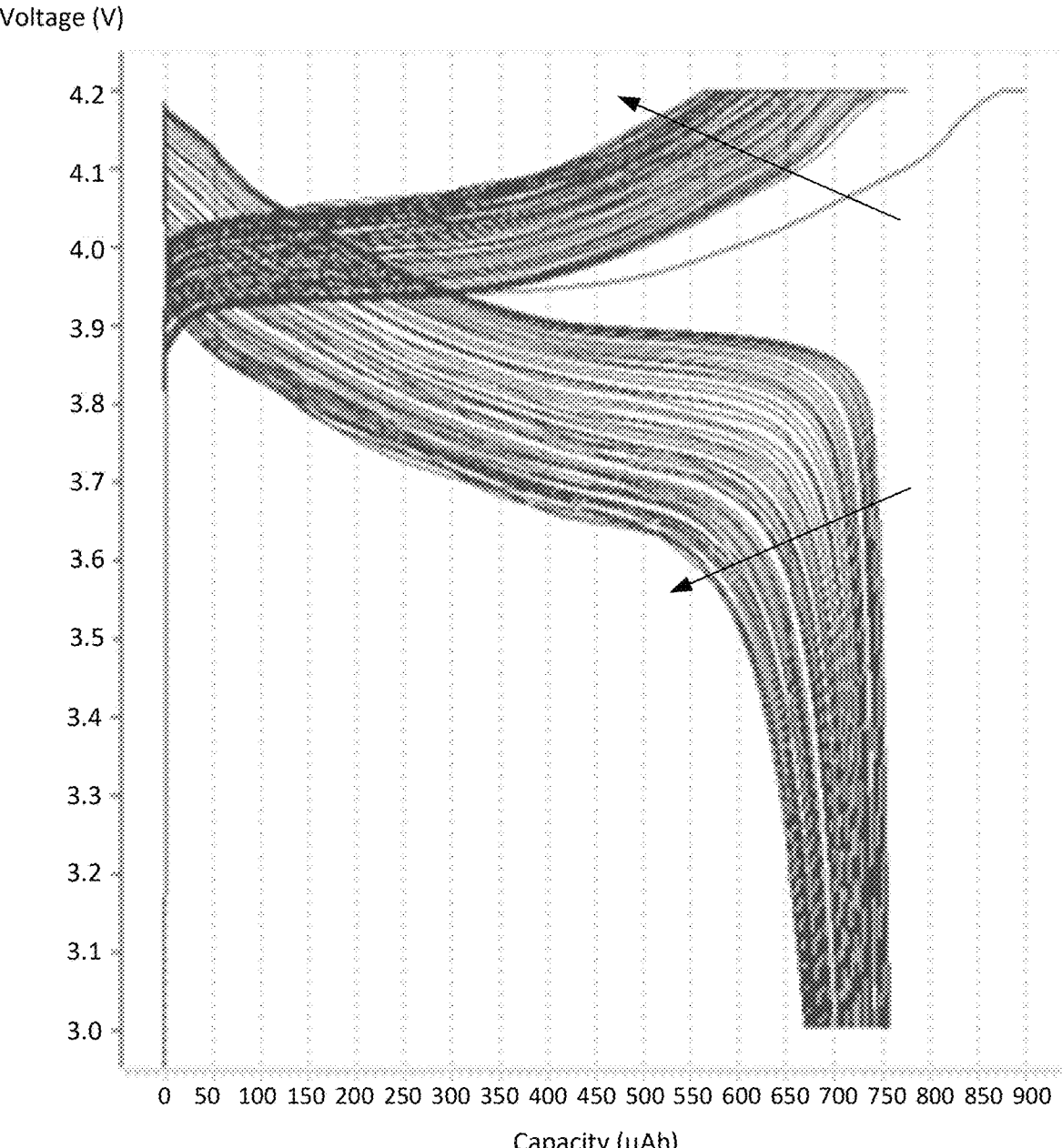
FIGS. 5A-B are graphs showing charge-discharge curves of $LiCoO_2$ films respectively wet annealed at 600° C. only (FIG. 5A) and wet annealed at 600° C. then dry annealed at 700° C.
Figure 5B:
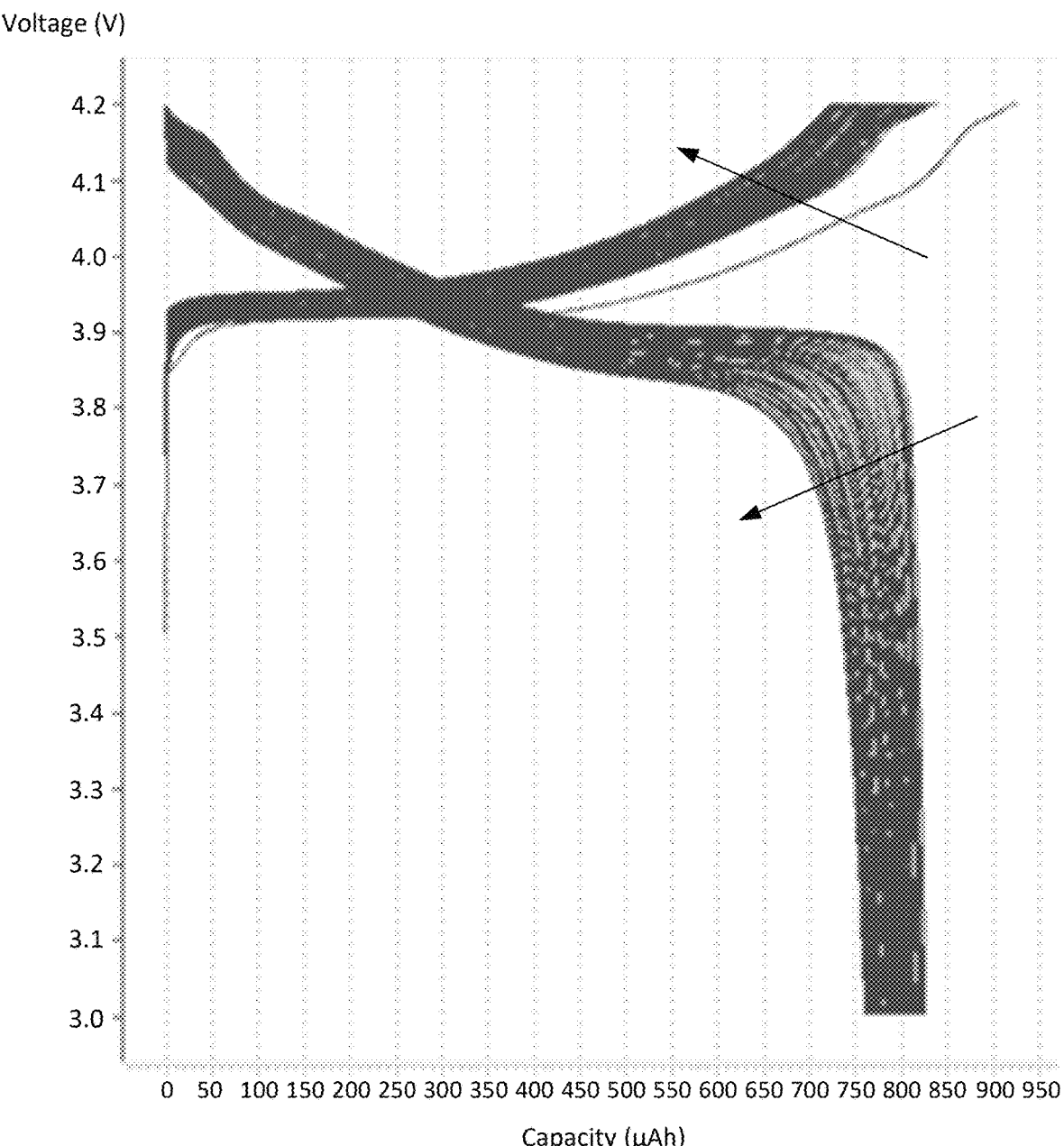

FIGS. 5A-B show charge-discharge curves of half cells incorporating $LiCoO_2$ films wet-annealed at 600° C. for 4 h (FIG. 5A), and wet-annealed at 600° C. for 4 h, followed by dry annealing at 700° C. for 1 h (FIG. 5B). The arrows in FIGS. 5A-B point from cycle 1 to cycle 60. The data show higher capacity and improved cycling stability of the $LiCoO_2$ film wet-annealed at 600° C. for 4 h, followed by dry annealing at 700° C. for 1 h, but both samples show acceptable properties. The results are not believed to be significantly different when the samples are wet-annealed under continuous "fully wet" conditions or in accordance with the two-phase wet annealing process disclosed herein.

Figure 6A:
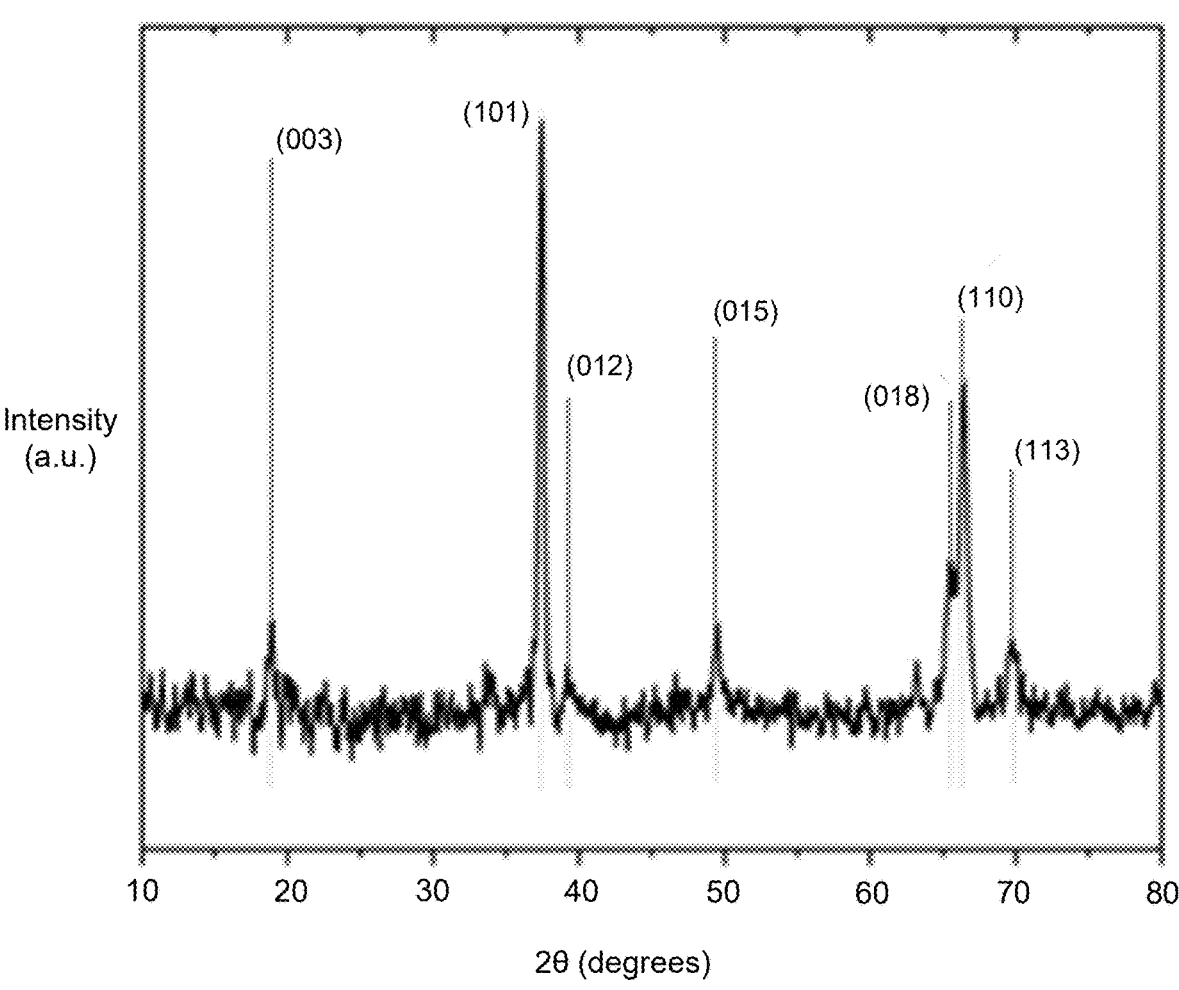
FIGS. 6A-B are XRD patterns of $LiCoO_2$ films respectively wet annealed at 600° C. only (FIG. 6A) and wet annealed at 600° C. then dry annealed at 700° C.
Figure 6B:
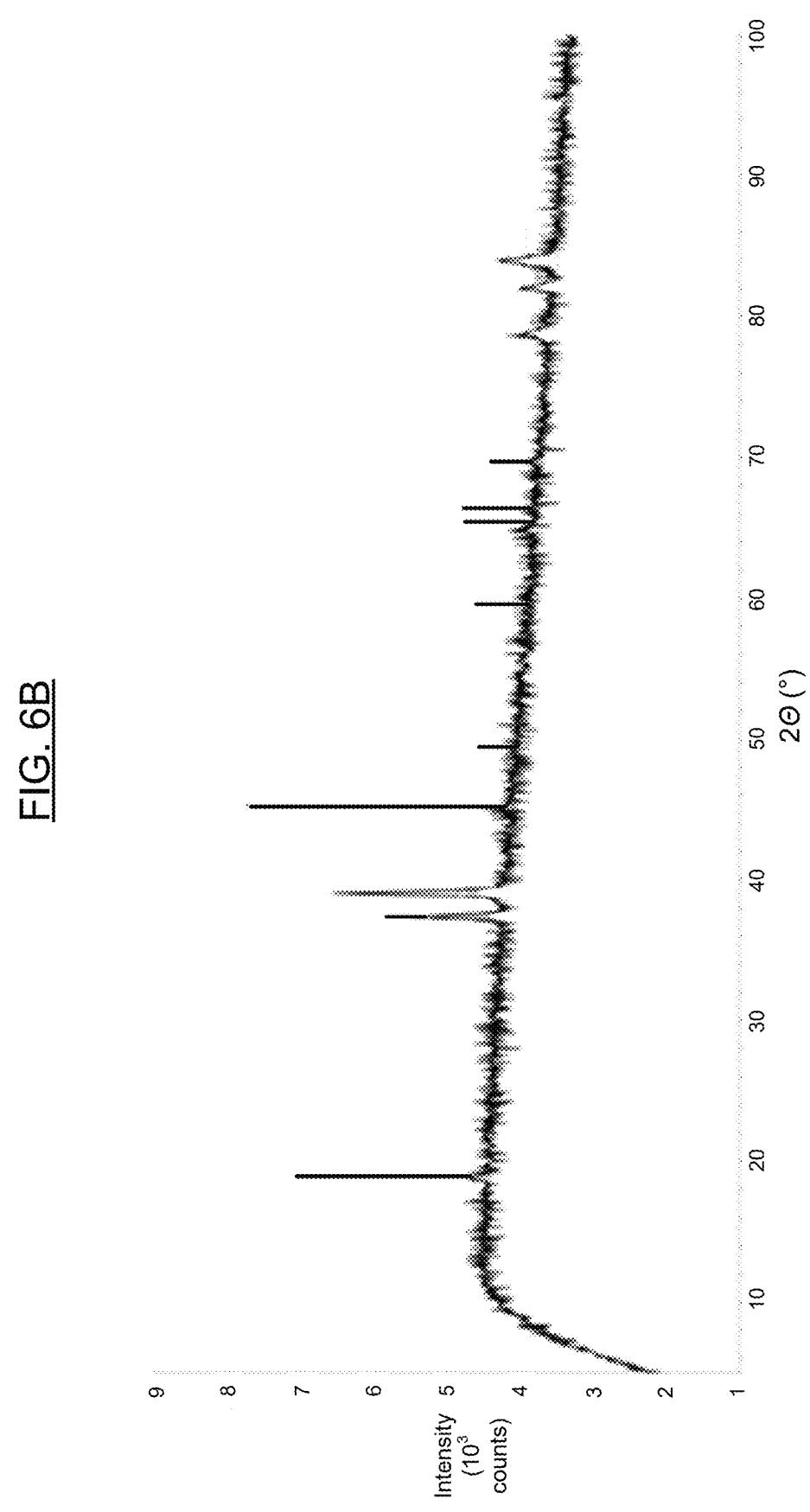

FIGS. 6A-B show XRD patterns of $LiCoO_2$ films wet-annealed at 600° C. for 4 h (FIG. 6A) or at 600° C. for 4 h, followed by dry annealing at 700° C. for 1 h (FIG. 6B). In both cases, the $LiCoO_2$ films were crystallized in the hexagonal phase (PDF #04-008-6329), but the textures of the $LiCoO_2$ films are different. FIG. 6A shows three predominant peaks: (003), (101), and (110). FIG. 6B shows two predominant peaks (012) and (101), with the (003) peak being barely visible. Since the presence of the (003) peak is believed to be detrimental to fast lithium-ion diffusion in LCO films (see Bates et al., "Preferred Orientation of Polycrystalline $LiCoO_2$ Films," J. Electrochem. Soc., vol. 147, iss. 1, pp. 59-70 [2000]), the absence of the (003) peak in the LCO film wet-annealed at 600° C., followed by dry annealing at 700° C., explains its superior cycling performance. The results are not believed to be significantly different when the samples are wet-annealed under continuous "fully wet" conditions or in accordance with the two-phase wet annealing process disclosed herein.

The XRD data in FIG. 6B shows the substantial absence of the (003) peak for the LCO film made with a "wet+dry" annealing process. If an LCO film shows a dominant (003) peak, the crystalline planes are mostly parallel with the substrate, and so it may be difficult for lithium ions to diffuse out of the LCO film. Consequently, the (003) peak should be minimized or eliminated, while non-(003) peaks such as (101) or (012) peaks are desirable for fast lithium ion diffusion in LCO films. Similar principles apply to other lithium metal oxide films. Thus, the cycling performance of wet-annealed lithium metal oxide films can be significantly improved by an additional dry annealing phase, following wet annealing. The films have a higher charge capacity and better capacity retention (i.e., the battery will have a longer cycle life).

Moisture may accelerate oxidation of lithium metal oxide films and enhance their p-type electron conductivity. With the presence of water vapor (e.g., steam) at a temperature of ~600° C.±50° C., the surface of the lithium metal oxide film may undergo continuous modification due to repeated cleavage of M-O-M bonds (M-O-M+$H_2O$→2M-OH, M=Li or, e.g., Co) and their recondensation into lesser-strained oxide forms (2M-OH→M-O-M+$H_2O$). This mechanism can result in smoother surface, higher crystallinity, higher p-type electron conductivity, and higher lithium-ion diffusivity of the lithium metal oxide films.

At temperatures of ~550-690° C., water molecules dissociate relatively easily to release protons (e.g., water vapor can function as an acid at high temperature). There exists a surface layer on as-deposited lithium metal oxide films that may be formed on exposure to air after deposition. The surface layer includes mainly LiOH and $Li_2CO_3$, which can be neutralized and/or decomposed during the present wet anneal:

$$2LiOH+heat \rightarrow Li_2O+H_2O\uparrow$$

$$Li_2CO_3+H_2O+heat \rightarrow Li_2O+H_2CO_3$$

$$H_2CO_3+heat \rightarrow H_2O\uparrow+CO_2\uparrow$$

The surface layer containing LiOH and $Li_2CO_3$ is typically poorly Li-ion conductive. When it is etched away or otherwise altered by the hot water vapor, lithium-based solid-state battery cells with drastically reduced impedance can be produced from the lithium metal oxide films.

In some lithium metal oxide films (e.g., $LiCoO_2$), a relatively high concentration of Li can result in a serious "Li-loss" problem during high-temperature calcination or sintering, due to loss of volatile $Li_xO$ species. In one experiment, a $LiCoO_2$ film was made according to the above four-step wet annealing method, in which the "semi-wet" phase was conducted at 600° C. for 3 hours using CDA at 10 SCFH, and the "fully wet" phase was conducted at 600° C. for 1 hour using CDA at 10 SCFH. Both the "semi-wet" phase and the "fully wet" phase were carried out using a bubbler containing boiling water. A substantially identical dry annealing process (i.e., no water bubbler) was conducted using the same furnace and the same ramp-up and cool-down steps (i.e., the first and fourth steps) as the wet annealing example, but at 700° C. for 4 hours using CDA only (i.e., no water vapor) at 10 SCFH in place of the "semi-wet" phase and the "fully wet" phase.

The Li and Co contents of the $LiCoO_2$ films after the wet annealing and dry annealing experiments described above were determined with an inductively coupled plasma (ICP) spectrometer. The results are shown in the table below. The data show that lithium loss is prevented during wet annealing, but not during dry annealing. The good stoichiometry of wet-annealed $LiCoO_2$ films results in superior cycling performance.

| Process | $^7Li$ (ppb) | $^{59}Co$ (ppb) | Li/Co atomic ratio |
|---|---|---|---|
| Wet annealing | 75.199 | 601.726 | 1.050 |
| Dry annealing | 57.423 | 526.900 | 0.915 |

Experimentation has also shown that continuous wet annealing at a constant or substantially constant temperature and a constant or substantially constant humidity or water vapor concentration (i.e., single-phase wet annealing) provides lithium metal oxide films with suitable properties for solid-state batteries, but the present two-phase wet annealing method, or similar methods in which the humidity or water vapor concentration increases with annealing time (e.g., using gradient or step-wise increasing moisture levels) can decrease and/or minimize lifting, flaking, or delamination of the lithium metal oxide films (e.g., after annealing). The flaking issue also depends on the thickness of the lithium metal oxide film (i.e., the thicker the lithium metal oxide film, the more severe the flaking issue).

In further embodiments, the amount of water vapor that provides beneficial effects can be quite minimal. For example, in some embodiments (e.g., in which the substrate 110 is relatively thin, for example in the range of 10-25 μm or less), in the first, "semi-dry" phase, water vapor from a bubbler is not necessary. Humidity in the air (e.g., air having a relative humidity of 50% or higher, 70% or higher, 80% or higher, etc.) can provide sufficient water vapor in the first, "semi-dry" phase, as can residual water adsorbed onto and/or into the walls of the furnace (e.g., from a previous occurrence of the wet annealing method). In a sufficiently humid environment (e.g., air having a relative humidity of 80% or higher, 90% or higher, etc.), water vapor from the bubbler may not be necessary during the second phase of the wet annealing method. Thus, even a gas tank (e.g., tank 220 in FIG. 7) is not necessary in the apparatus 200, as the method can be conducted in humid ambient air. As long as there is some water vapor present in the first, "semi-dry" phase and sufficient (e.g., slightly greater) water vapor present in the second phase of the present wet annealing method, the present method provides (i) lithium metal oxide films with reduced lifting and/or haziness and (ii) lithium-based solid-state battery cells that include the wet-annealed lithium metal oxide films with a reduced impedance, reduced lithium loss and/or an improved Li-metal stoichiometry.

Compared to dry annealing, the present two-phase wet annealing method provides the following advantages:

Wet annealing significantly lowers the crystallization temperature of lithium metal oxide films such as by as much as about 100° C., enabling production of functional structures on low-temperature materials such as metal (e.g., stainless steel, aluminum or copper) foils and films.

Dry-annealed lithium metal oxide films such as $LiCoO_2$ can look hazy after annealing, and can result in lithium-based solid-state battery cells with exceptionally high impedance. The present wet-annealed lithium metal oxide films show smooth surfaces without the presence of cracks or voids, and result in lithium cells with low impedance.

Lithium metal oxide films wet annealed at relatively low temperatures (e.g., ≤650° C.) are fully crystallized with predominant orientations that are conducive to fast lithium-ion diffusion (e.g., (101) or (012)). Half-cell data show stable charging and recharging cycling. (Cycling stability is expected to be much better in all-solid-state cells as compared to cells containing a liquid phase due to the absence of the side reactions involving typical liquid electrolytes.)

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A method of making a lithium metal oxide film, comprising:
   flowing an oxygen-containing gas over or through a source of water vapor to prepare a first oxygen-containing atmosphere;
   wet annealing the lithium metal oxide film in a first phase at a first temperature of 450-750° C. for a first length of time, in the first oxygen-containing atmosphere; and
   after wet annealing the lithium metal oxide film, dry annealing the lithium metal oxide film at a second temperature greater than the first temperature, for a second length of time, in a second oxygen-containing atmosphere substantially free of water vapor,
   wherein the metal in the lithium metal oxide film is cobalt (Co), manganese (Mn), nickel (Ni), titanium (Ti) or iron (Fe).

2. The method of claim 1, wherein the first length of time is at least 0.02 hour.

3. The method of claim 1, wherein wet annealing the lithium metal oxide film further comprises a second phase following the first phase, conducted at a third temperature for a third length of time, in a third oxygen-containing atmosphere comprising the oxygen-containing gas bubbled through the source of water vapor.

4. The method of claim 3, wherein the third temperature is 450-750° C.

5. The method of claim 3, wherein the third temperature is the first temperature ±50° C.

6. The method of claim 5, wherein the third temperature is the same as the first temperature.

7. The method of claim 3, wherein the first length of time and the third length of time together are in the range of 0.1-8 hours.

8. The method of claim 7, wherein the first length of time is 0.1-6 hours, the second length of time is 1 hour, and the third length of time is 5-180 minutes.

9. The method of claim 1, wherein the second length of time is less than or equal to the first length of time.

10. The method of claim 9, wherein the second length of time is less than the first length of time and the third length of time combined.

11. The method of claim 1, wherein the oxygen-containing gas comprises clean dry air, clean undried air, filtered air, ambient air, scuba gas, or oxygen.

12. The method of claim 1, further comprising, prior to wet annealing the lithium metal oxide film, increasing a temperature of a furnace in which the lithium metal oxide film is annealed from room temperature to the first temperature at a rate of 1-20° C./min, and the first temperature is 550-690° C.

13. The method of claim 1, wherein the first temperature is 600° C.±50° C., the second temperature is 700° C., the oxygen-containing gas is flowed at a rate of 2-50 standard liters per minute, and the second oxygen-containing atmosphere is clean dry air.

14. The method of claim 1, wherein the source of water vapor comprises a bubbler containing water at a temperature of 80-100° C.

15. A method of making a solid-state battery or battery cell, comprising:
   depositing a lithium metal oxide film on a metal substrate, and
   annealing the lithium metal oxide film by the method of claim 1.

16. The method of claim 15, wherein the metal substrate is configured to function as a cathode current collector in the solid-state battery or battery cell.

17. The method of claim 16, further comprising:
   forming a cathode on the metal substrate when the metal substrate functions as a cathode current collector, the cathode comprising the lithium metal oxide film;
   forming a solid-phase or solid-state electrolyte layer on the cathode;
   forming an anode current collector on the electrolyte layer; and
   forming electrical contacts to the cathode current collector and the anode current collector.

18. The method of claim 17, further comprising encapsulating and/or packaging the solid-state battery or battery cell.

19. The method of claim 17, wherein the cathode comprises lithium cobalt oxide, lithium nickel oxide, lithium manganese oxide or lithium iron phosphate.

20. The method of claim 1, wherein the metal substrate comprises a metal foil, and the metal foil comprises stainless steel, aluminum, copper, nickel, inconel, brass, molybdenum or titanium, the elemental metals of which may be alloyed with up to 10% of one or more other elements.

* * * * *